United States Patent [19]
Gierek et al.

[11] 3,940,516
[45] Feb. 24, 1976

[54] FIREPROOF INORGANIC PROTECTIVE COATING AND THE METHOD OF ITS PRODUCTION

[75] Inventors: Adam Gierek, Brynow-Katowice; Stanislaw Pawlowski, Gliwice; Boleslaw Formanek, Bytom; Eugeniusz Piesiur, Chorzow; Grzegorz Pucka; Bogdan Blachnicki, both of Katowice; Jerzy Rychlewski, Chorzow; Janusz Gajda, Katowice, all of Poland

[73] Assignee: Politechnika Slaska im Wincentego Pstrowskiego, Gliwice, Poland

[22] Filed: Apr. 19, 1974

[21] Appl. No.: 462,536

[30] Foreign Application Priority Data
May 30, 1973 Poland .................................. 162937

[52] U.S. Cl. .............. 427/372; 106/15 FP; 252/8.1; 427/376; 428/446; 428/452; 428/921
[51] Int. Cl.² ...................... B05D 3/02; C09D 5/18
[58] Field of Search ....... 117/138, 169, 169 A, 147, 117/151, 138.8 D, 138.8 UA, 120; 252/8.1; 106/15 FP, 48; 118/608; 427/372, 376; 428/446, 452, 921

[56] References Cited
UNITED STATES PATENTS

| | | |
|---|---|---|
| 2,901,379 | 8/1959 | Shannon et al. ................ 117/138 X |
| 3,278,328 | 10/1966 | Okrent............................ 117/138 X |
| 3,451,842 | 6/1969 | Kurz ............................... 117/138 X |
| 3,547,670 | 12/1970 | Fuchs et al. .................... 117/129 X |
| 3,748,170 | 7/1973 | Michael........................... 106/48 X |

*Primary Examiner*—Harry J. Gwinnell
*Attorney, Agent, or Firm*—Waters, Schwartz & Nissen

[57] ABSTRACT

An inorganic fireproof protective coating composition consisting of 5 to 15 percent by weight of a powdered silicate-oxide sinter or alloy, 15 to 35 percent by weight of an anhydrous powdered alumosilicate substance, and 50 to 80 percent of the acid phosphates of aluminum, chromium, magnesium or calcium, or mixtures thereof. All three ingredients of the coating form a suspensoid upon mixing and thereafter they are subjected to self-hardening at room temperature. The hardening process may be accelerated by heating up to 150°C. The coating is designed for protection of products made of readily inflammable materials, particularly of wood and of wood-like materials, against destruction by fire or glow.

3 Claims, No Drawings

FIREPROOF INORGANIC PROTECTIVE COATING AND THE METHOD OF ITS PRODUCTION

Background of the Invention

The invention relates to a new fireproof inorganic protective coating, and to the method for preparation of said coating designed for protection of products made of readily inflammable materials, particularly of wood and of wood-like materials, against destruction by fire or glow. The coatings according to the invention can also be successfully used for covering the surface of products made of plastics, particularly of those made of polystyrene or polyurethane.

The fireproof materials and coatings used hitherto for impregnation and for covering the surface of readily inflammable wood and wood-like materials were based on ammonium and sodium phosphates, on alumosilicates or potassium silicates in the form of water glass, as well as on Portland cements or alumina cements. Such coatings are toxic or easy wettable and permeable by liquids, water-soluble and therefore they are not capable of being washed without damage.

Summary of the Invention

The fireproof protective coating according to the invention is not subject to the above mentioned limitations. It is insoluble in water, impermeable by liquids, washable and non-toxic. These good properties, as well as complete resistance against fire and glow, are obtained because the new coating material is produced from three specially selected and combined components.

The first ingredient actively reacts with the binding material of the coating, and is a silicate-oxide ceramic sinter or alloy, having the following chemical composition: 50—65 percent by weight of $Fe_2O_3+FeO$ in any proportion of ($Fe_2O_3/FeO$); 3–8 percent by weight of $CuO+Cu_2O$, in any proportion of ($CuO/Cu_2O$); 2 to 7 percent by weight of CaO; and 20 to 30 percent by weight of of $SiO_2$. It may also, include other oxides, for instance $Al_2O_3$, $TiO_2$, NiO, CoO, MgO, $Na_2O$ and $K_2O$ in any weight proportions, and in a total quantity from zero up to 10 percent by weight.

The second ingredient is an anhydrous aluminosilicate substance either in a natural state or after being subjected to sintering at a temperature above 1000°C, said substance including 40 to 75 percent by weight of $SiO_2$; 10 to 45 percent by weight of $Al_2O_3$; 0 to 15 percent by weight of $Fe_2O_3$ plus FeO in any proportion of ($Fe_2O_3/FeO$), as well as other oxides in a total of 0 to 10 percent by weight, these oxides being $TiO_2$, CaO, MgO, $Na_2O$ and $K_2O$ in any relative weight proportions. This ingredient constitutes the ceramic filler of the coating.

The third ingredient is an intensively binding inorganic binder either in the form of a water solution of the acid phosphate of aluminum, chromium, magnesium or calcium, having a density of 1.3 to 1.6 g/cc, or in the form of a mixture of these phosphates in any weight proportions. The best results are obtained by using the acid mono-and dibasic phosphates of the type $Me^{III}(H_2PO_4)_3$, $Me_2^{III}(HPO_4)_3$, $Me^{II}(H_2PO_4)_2$ and $Me^{II}(HPO_4)$, where $Me^{III}$ represents $Al^{3+}$ and $Cr^{3+}$, and where $Me^{II}$ represents $Mg^{2+}$ and $Ca^{2+}$.

The fireproof inorganic coating according to the invention consists of 5 to 15 percent by weight of the first ingredient, 15 to 35 percent by weight of the second ingredient, and 50 to 80 percent by weight of the third ingredient.

The method of manufacturing the coating according to the invention consists in grinding the first and second ceramic ingredients until a grain size below 0.5 mm is reached, preferably until a grain size of 0.1 mm is reached; in preparing the third ingredient by dissolving the oxides or hydroxides of aluminum, chromium, magnesium or calcium in concentrated phosphoric acid at 60° to 80°C, diluting the reaction products with water to the required density of 1.3 to 1.6 g/cc; and mixing the coating ingredients in the above specified proportions until they produce a suspensoid. The coating is then applied on the surface of a readily inflammable material by means of brushing, by spraying or by immersion and is then dried in air at room temperature.

During the drying process the ingredients of the coating react with each other so that a self-hardening process takes place. This process may be accelerated by heating the coating up to a temperature of about 150°C.

Description of Preferred Embodiments

Exemplary compositions of the protective coatings are as follows:

| Coating | Ingredient I percent by weight | Ingredient II percent by weight | Ingredient III percent by weight |
|---|---|---|---|
| 1 | 5 | 15 | 80-water solution of $Al(H_2PO_4)_3$ of a density about 1.45 g/cc, containing about 32 percent by weight of $P_2O_5$, and about 10 percent of $Al_2O_3$ |
| 2 | 10 | 25 | 65-water solution of $Al(H_2PO_4)_3$ and $Cr(H_2PO_4)_3$ at a density 1.55 g/cc containing about 36 percent of $P_2O_5$, 9 percent by weight of $Al_2O_3$, and 3 percent of $Cr_2O_3$. |
| 3 | 15 | 35 | 50-water solution of $Mg(H_2PO_4)_2$ at a density about 1.4 g/cc containing about 8 percent by weight of Mg and about 28 percent of $P_2O_5$. |

An example of the method for the preparation of the coating according to the invention is presented below.

Example

The first ingredient, i.e. the silicate oxide sinter or alloy is ground, preferably in a ball mill or in a vibration mill, until a grain size below 0.1 mm is reached. The second ingredient, i.e. the anhydrous aluminosilicate substance, is ground in the same manner.

The third ingredient, i.e. the phosphate binder, is obtained by dissolving either aluminum hydroxide, chromium oxide, magnesium oxide, or calcium oxide in phosphoric acid at a 60 percent concentration, while the quantities of individual substances are taken in accordance with the stoichiometric composition of mono- and dibasic phosphates. The reaction product is subjected to a slight dilution with water until the required density is obtained.

All three ingredients of the coating according to the invention are mixed together, preferably in a propeller mixer, thus obtaining a suspensoid of ceramic ingredients in a water solution of acid phosphates.

The coating is applied on a surface by spraying so that a protective layer of about 0.5 to 3.0 mm in thickness, preferably of about 1.0 mm, is obtained.

The coated material is then left for about 12 hours for drying in air at room temperature. During that time the setting and self-hardening of the coating occurs.

By heating a wet coating up to 150°C, preferably by using infra-red radiators, the hardening process may be reduced down to about 30 minutes.

The invented fireproof inorganic coating is suitable for coating of products made of wood and wood-like materials, particularly for coating of fibre-, chip-, and shove boards of all kinds of plywood etc., in order to protect them against fire and glow.

We claim:

1. A fireproof inorganic protective air hardenable coating mixture comprising (A) 5 to 15 percent by weight of a silicate oxide sinter or alloy comprising 50 to 65 percent by weight of $Fe_2O_3$ plus FeO in any weight proportion, 3 to 8 percent of CuO plus $CuO_2$ in any weight proportion, 2 to 7 percent by weight of CaO, 20 to 30 percent by weight of $SiO_2$, and 0 to 10 percent of other oxides selected from the group consisting of $Al_2O_3$, $TiO_2$, NiO, CoO, MgO, $Na_2O$ and $K_2O$ in any weight proportion; (B) 15 to 35 percent by weight of an anhydrous aluminosilicate substance either in the natural state or sintered at a temperature above 1,000°C, said substance comprising 40 to 75 percent by weight of $SiO_2$, 10 to 45 percent by weight of $Al_2O_3$, 0 to 15 percent by weight of $Fe_2O_3$ plus FeO in any weight proportion, and 0 to 10 percent by weight of other oxides selected from the group consisting of $TiO_2$, CaO, MgO, $Na_2O$ and $K_2O$ in any weight proportions, and (C) 50 to 80 percent by weight of an acid solution of mono- or dibasic phosphates of aluminum, chromium, magnesium or calcium, or of their mixtures in any weight proportion, said acid solution having a density of 1.3 to 1.6g/cc.

2. A method of producing a coated substrate comprising grinding to a grain size smaller than 0.5 mm (A) 5 to 15 percent by weight of a silicate oxide sinter or alloy comprising 50 to 65 percent by weight of $Fe_2O_3$ plus FeO in any weight proportion, 3 to 8 percent of CuO plus $CuO_2$ in any weight proportion, 2 to 7 percent by weight of CaO, 20 to 30 percent by weight of $SiO_2$, and 0 to 10 percent of other oxides selected from the group consisting of $Al_2O_3$, TiO, NiO, CoO, MgO, $Na_2O$ and $K_2O$ in any weight proportion and (B) 15 to 35 percent by weight of an anhydrous aluminosilicate substance in the natural state or which has been sintered at a temperature above 1,000°C, and said substance comprising 40 to 75 percent by weight of $SiO_2$, 10 to 45 percent by weight of $Al_2O_3$, 0 to 15 percent by weight of $Fe_2O_3$ plus FeO in any weight proportion, and 0 to 10 percent by weight of other oxides selected from the group consisting of $TiO_2$, CaO, MgO, $Na_2O$ and $K_2O$ in any weight proportion; mixing the ground material in a water solution of mono- or dibasic acid phosphates of aluminum, chromium, magnesium, or calcium or a mixture of said acid phosphates, the solution of acid phosphate having a density of 1.3 to 1.6 g/cc, and forming a suspensoid of said ground material in the solution; applying a coating of the suspensoid to the surface of a substrate and hardening the coating in air at a temperature from room temperature up to about 150°C.

3. The method according to claim 2 comprising grinding (A) and (B) to a grain size smaller than 0.1mm.

* * * * *